US012638223B2

(12) United States Patent
Merritt et al.

(10) Patent No.: US 12,638,223 B2
(45) Date of Patent: May 26, 2026

(54) CABIN AIR COMPRESSOR BYPASS FOR SURGE AVOIDANCE

(71) Applicant: Hamilton Sundstrand Corporation, Charlotte, NC (US)

(72) Inventors: Brent J. Merritt, Southwick, MA (US); Viktor Kilchyk, Lancaster, NY (US); Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 355 days.

(21) Appl. No.: 18/305,565

(22) Filed: Apr. 24, 2023

(65) Prior Publication Data

US 2024/0353161 A1     Oct. 24, 2024

(51) Int. Cl.

| | |
|---|---|
| *F25B 49/02* | (2006.01) |
| *B64D 13/08* | (2006.01) |
| *F25B 9/00* | (2006.01) |
| *F25B 9/06* | (2006.01) |
| *B64D 13/06* | (2006.01) |

(52) U.S. Cl.
CPC ............ *F25B 49/022* (2013.01); *B64D 13/08* (2013.01); *F25B 9/004* (2013.01); *F25B 9/06* (2013.01); *B64D 2013/0618* (2013.01); *B64D 2013/0644* (2013.01); *F25B 2400/0401* (2013.01); *F25B 2600/2501* (2013.01)

(58) Field of Classification Search
CPC .......... F25B 49/022; F25B 9/004; F25B 9/06; B64D 13/06; B64D 13/08; B64D 2013/0603; B64D 2013/0648; F02C 7/18
See application file for complete search history.

(56) References Cited

U.S. PATENT DOCUMENTS

| | | | | |
|---|---|---|---|---|
| 6,128,909 A | * | 10/2000 | Jonqueres | .............. B64D 13/06 62/93 |
| 7,322,202 B2 | * | 1/2008 | Zywiak | ................. F24F 5/0085 62/401 |
| 10,160,547 B2 | | 12/2018 | Bruno et al. | |
| 10,807,722 B2 | | 10/2020 | Himmelmann | |

(Continued)

OTHER PUBLICATIONS

Search Report issued in European Patent Application No. 24172172.9; Application Filing Date Apr. 24, 2024; Date of Mailing Sep. 10, 2024 (7 pages).

*Primary Examiner* — Jerry-Daryl Fletcher
*Assistant Examiner* — Daniel C Comings
(74) *Attorney, Agent, or Firm* — CANTOR COLBURN LLP

(57) ABSTRACT

An environmental control system for a vehicle includes a source of a first medium, a cabin air compressing device including a compressor having a compressor inlet and a compressor outlet, and a conduit fluidly coupling the source of the first medium to the compressor inlet. The first medium provided to the compressor inlet is output at the compressor outlet as a compressed first medium. An environmental control system pack is located downstream from and is fluidly coupled to the compressor outlet. The environmental control system pack includes a ram air circuit having at least one ram air heat exchanger. Another conduit for providing a second medium to the compressor fluidly couples an outlet of the at least one ram air heat exchanger and the compressor inlet.

18 Claims, 3 Drawing Sheets

(56) References Cited

U.S. PATENT DOCUMENTS

| | | | |
|---|---|---|---|
| 11,459,110 | B2 | 10/2022 | Bruno |
| 11,773,778 | B1 * | 10/2023 | Retersdorf ................ F02C 9/18 |
| | | | 60/785 |
| 2007/0113579 | A1 | 5/2007 | Claeys et al. |
| 2012/0285184 | A1 | 11/2012 | Voinov |
| 2016/0325840 | A1 | 11/2016 | Merritt et al. |
| 2017/0305558 | A1 * | 10/2017 | Bruno ................... B64D 13/06 |
| 2017/0341758 | A1 * | 11/2017 | Bruno ................... F04D 25/045 |
| 2019/0291875 | A1 | 9/2019 | Behrens et al. |
| 2020/0070986 | A1 | 3/2020 | Zug |

* cited by examiner

CABIN AIR COMPRESSOR BYPASS FOR SURGE AVOIDANCE

BACKGROUND

Exemplary embodiments pertain to the art of thermal management and, in particular, to thermal management of one or more loads of a vehicle.

Environmental control systems (ECS) are utilized on various types of aircraft for several purposes, such as air supply systems and/or cabin condition systems for the aircraft. For example, components of the environmental control system may be utilized to remove heat from various aircraft lubrication and electrical systems and/or used to condition aircraft cabin air. A cabin air conditioning may include one or more cabin air compressing devices (CAC) which compress air entering the system from an outside source or from a ram air system. The compressed air is typically delivered to an environmental control system pack to bring it to a desired temperature then delivered to the aircraft cabin. After passing through the cabin, the air is typically exhausted to the outside. The CACs may be driven, for example, by air-cooled electric motors.

In an environmental control system utilizing two CACs, it is desirable to operate both CACs at relatively identical flow levels, known as operating at nearly identical operating points on a compressor map, or symmetrical operation. Failure to do so may result in various inefficient or undesirable operational characteristics, such as compressor surging, that can lead to unstable airflow. In an effort to monitor the operating points of the CACs, various sensors are employed. Inherent errors associated with the sensors may lead to uncertainty of operating points. Various other reasons lead to asymmetric operation, thereby causing inefficient and/or undesirable operation of the CACs.

BRIEF DESCRIPTION

According to an embodiment, an environmental control system for a vehicle includes a source of a first medium, a cabin air compressing device including a compressor having a compressor inlet and a compressor outlet, and a conduit fluidly coupling the source of the first medium to the compressor inlet. The first medium provided to the compressor inlet is output at the compressor outlet as a compressed first medium. An environmental control system pack is located downstream from and is fluidly coupled to the compressor outlet. The environmental control system pack includes a ram air circuit having at least one ram air heat exchanger. Another conduit for providing a second medium to the compressor fluidly couples an outlet of the at least one ram air heat exchanger and the compressor inlet.

In addition to one or more of the features described herein, or as an alternative, in further embodiments a pressure of the second medium is equal to a pressure of the compressed first medium.

In addition to one or more of the features described herein, or as an alternative, in further embodiments a pressure of the second medium is greater than a pressure of the compressed first medium.

In addition to one or more of the features described herein, or as an alternative, in further embodiments the second medium is the compressed first medium.

In addition to one or more of the features described herein, or as an alternative, in further embodiments the at least one ram air heat exchanger further comprises a primary heat exchanger and a secondary heat exchanger. The another conduit is fluidly connected to an outlet of the primary heat exchanger.

In addition to one or more of the features described herein, or as an alternative, in further embodiments the at least one ram air heat exchanger further comprises a primary heat exchanger and a secondary heat exchanger. The another conduit is fluidly connected to an outlet of the secondary heat exchanger.

In addition to one or more of the features described herein, or as an alternative, in further embodiments the cabin air compressing device further includes a shaft connected to the compressor and an electric motor operably connected to the shaft and configured to drive the compressor.

In addition to one or more of the features described herein, or as an alternative, in further embodiments a valve is associated with the another conduit. The valve is operable to control a supply of the second medium provided to the compressor inlet.

In addition to one or more of the features described herein, or as an alternative, in further embodiments a controller is operable to move the valve between a plurality of positions to control the supply of the second medium provided to the compressor inlet.

In addition to one or more of the features described herein, or as an alternative, in further embodiments the first medium includes ram air.

In addition to one or more of the features described herein, or as an alternative, in further embodiments the first medium includes bleed air.

In addition to one or more of the features described herein, or as an alternative, in further embodiments the vehicle is an aircraft.

According to an embodiment, a method of operating an environmental control system of a vehicle includes providing a first medium to a compressor inlet of a compressor of a cabin air compressing device via a conduit, compressing the first medium at the compressor to produce a compressed first medium, providing the compressed first medium to an environmental control system pack, and directing a flow of a second medium provided at an outlet of a ram air heat exchanger of the environmental control system pack to the compressor inlet.

In addition to one or more of the features described herein, or as an alternative, in further embodiments directing the flow of the second medium to the compressor inlet includes operating a valve associated with another conduit. The another conduit fluidly connecting the outlet of the ram air heat exchanger and the compressor inlet.

In addition to one or more of the features described herein, or as an alternative, in further embodiments sensing a parameter at the compressor inlet and/or a compressor outlet and operating the valve in response to the parameter.

In addition to one or more of the features described herein, or as an alternative, in further embodiments the ram air heat exchanger is a primary heat exchanger.

In addition to one or more of the features described herein, or as an alternative, in further embodiments the ram air heat exchanger is a secondary heat exchanger.

In addition to one or more of the features described herein, or as an alternative, in further embodiments the second medium is the compressed first medium.

In addition to one or more of the features described herein, or as an alternative, in further embodiments the vehicle is an aircraft.

3

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
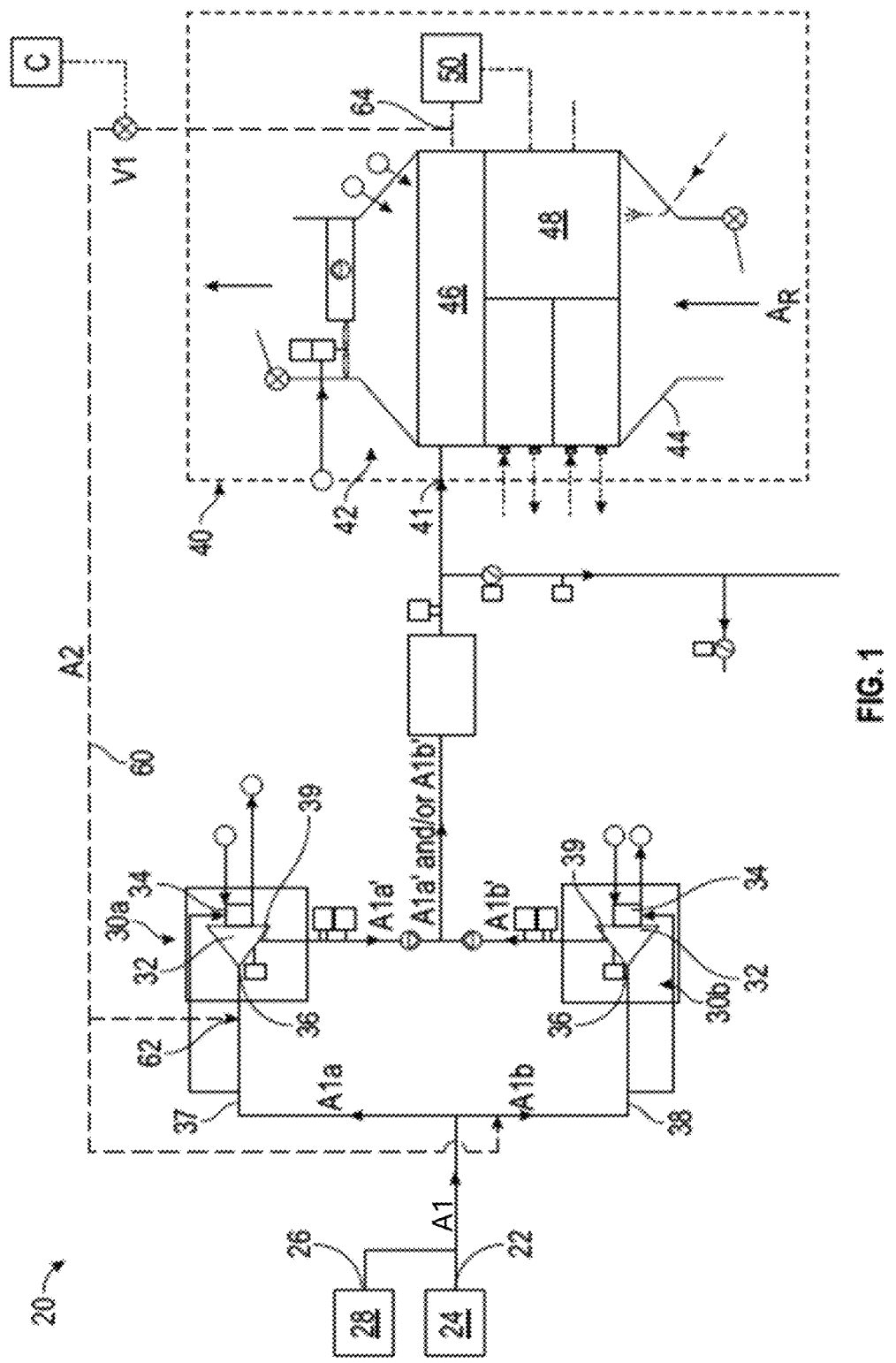
FIG. 1 is a schematic diagram of a portion of an environmental control system of a vehicle according to an embodiment.

With reference now to FIG. 1, a schematic diagram of a portion of an environmental control system (ECS) 20 is illustrated. The environmental control system 20 may be a refrigeration or air cycle subsystem and is configured to receive a first medium A at an inlet 22 from a first source 24 and/or at an inlet 26 from a second source 28. In the illustrated, non-limiting embodiment, the first source 24 is an engine or auxiliary power unit of the aircraft and the medium A is bleed air. Alternatively, or in addition, the first medium A provided to the inlet 26 may be fresh air, such as outside air for example. This outside air, also referred to herein as ram air, can be procured via one or more scooping mechanisms, such as an impact scoop or a flush scoop for example. In such embodiments, the first medium A from the inlet 26 is generally at an ambient pressure equal to an air pressure outside of the aircraft when the aircraft is on the ground and is between an ambient pressure and a cabin pressure when the aircraft is in flight. It should be understood that any suitable first medium A is within the scope of the disclosure. For example, other suitable mediums available on an aircraft include, but are not limited to cabin discharge air, which is air leaving the cabin and that would typically be discharged overboard.

It should be understood that the elements of the environmental control system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the environmental control system 20 can be regulated to a desired value.

The environmental control system 20 includes at least one cabin air compressing device. In the illustrated, non-limiting embodiments, the at least one cabin air compressing device includes a first cabin air compressing device 30a and a second cabin air compressing device 30b arranged in parallel. However, embodiments having only a single cabin air compressing device or more than two cabin air compressing devices are also within the scope of the disclosure. Each cabin air compressing device 30a, 30b is a mechanical device that includes one or more components for performing thermodynamic work on a medium (e.g., performs work on the medium by raising and/or lowering the pressure thereof and by raising and/or lowering the temperature thereof.)

Each cabin air compressing device 30a, 30b includes a compressor 32. A compressor 32 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

In the illustrated, non-limiting embodiment, the cabin air compressing device 30a, 30b additionally includes an electric motor 34, such as mounted to the shaft (not shown) of the compressor 32 to impart rotational motion thereto. The motor 34 can receive power from a power source (not shown) such as generator or a power bus (e.g., a power bus of an aircraft). It should be understood that in other embodiments, the cabin air compressing device 30a, 30b may include additional components, such as a turbine for example. In embodiments including both a turbine and a motor 34 operably coupled to the compressor 32, either or all of the turbine and the motor 34 may be used to drive the compressor 32.

During operation, the first medium A is provided to the environmental control system 20 from one or both of the inlet 22 and the inlet 26. In embodiments where the first medium A is provided from both sources, the two flows merge or mix at a location upstream from the junction where the flow splits into a first flow of first medium A1a provided to the inlet 36 of the first cabin air compressing device 30a via a first pressure conduit 37 and a second flow of first medium A1b provided to the inlet 36 of the second cabin air compressing device 30b via a second conduit 38. The act of compressing the medium A1a or A1b, heats the flow of medium A1a or A1b and increases the pressure of the thereof. Accordingly, at least one of a temperature and pressure of the compressed medium A1a' and A1b' provided at an outlet 39 of each compressor is greater than that of the medium A1a and A1b provided to the compressor inlet 36 of each respective compressor 32.

The first flow of compressed first medium A1a' and/or the second flow of compressed first medium A1b' output from at least one of the cabin air compressing devices 30a, 30b may then be provided to a downstream component or system 40 before it is delivered to a volume of the vehicle, such as a cabin for example. In an embodiment, the first flow of compressed first medium A1a' and the second flow of compressed first medium A1b' are combined upstream from the downstream component or system 40. In such embodiments, the combined flow may simply be referred to as the compressed first medium.

In an embodiment, the first flow of compressed first medium A1a' and/or the second flow of compressed first medium A1b' output from at least one of the cabin air compressing devices 30a, 30b is provided to an ozone converter 70 located upstream from the downstream system or component 40. The ozone converter 70 is configured to convert ozone within the first and/or second flow of compressed first medium A1a', A1b' into oxygen. The resulting reduced-ozone first and/or second flow of compressed first medium A1a', A1b' may then be provided to the downstream system 40 for further conditioning.

In the illustrated, non-limiting embodiment, downstream system 40 is an environmental control system (ECS) pack 40 and at least one of the first flow of compressed first medium A1a' and the second flow of compressed first medium A1b' is provided to an inlet 41 thereof. The ECS pack 40 operable to condition the at least one of the first flow of compressed first medium A1a' and the second flow of compressed first medium A1b' for example. As shown the ECS pack 40 is may include a ram air circuit 42 including a shell or duct, illustrated schematically at 44, within which one or more heat exchangers are located. The shell 44 can receive and direct a medium, such as ram air $A_R$ for example, through a portion of the ECS pack 40. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

Each of the one or more heat exchangers arranged within the shell 44 may be referred to as a ram air heat exchanger. In the illustrated, non-limiting embodiment, the at least one ram air heat exchanger includes a first or primary heat exchanger 46 and a second or secondary heat exchanger 48. However, it should be appreciated that embodiments including additional heat exchangers are also within the scope of the disclosure. Within the heat exchangers 46, 48 ram air AR, such as outside air, acts as a heat sink to cool a medium passing there through, for example at least one of the first flow of compressed first medium $A1a'$ and the second flow of compressed first medium $A1b'$ output from one or both of the cabin air compressing devices 30*a*, 30*b*.

The ECS pack 40 additionally comprises at least one thermodynamic device, illustrated schematically at 50. In the illustrated, non-limiting embodiment, the thermodynamic device 50 of the system 20 is a mechanical device that includes components for performing thermodynamic work on a medium (e.g., extracts work from or applies work to the first flow of compressed first medium $A1a'$ and/or the second flow of compressed first medium $A1b'$ by raising and/or lowering pressure and by raising and/or lowering temperature). Examples of the thermodynamic device 50 include an air cycle machine, a three-wheel air cycle machine, a four-wheel air cycle machine, etc.

Figure 3:
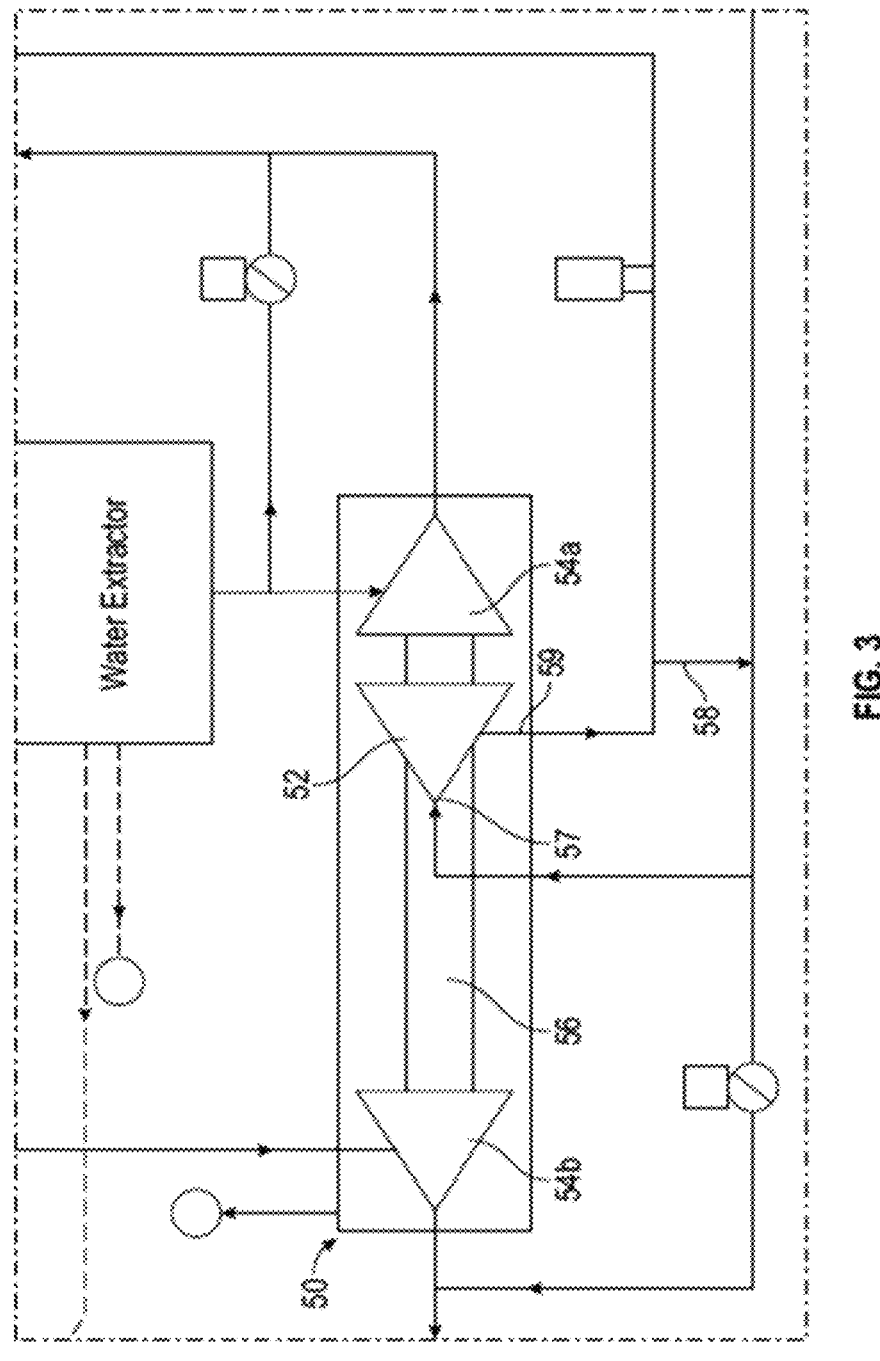
FIG. 3 is a schematic diagram of a thermodynamic device of an environmental control system pack according to an embodiment.

In the non-limiting embodiment shown in FIG. 3, the thermodynamic device 50 includes at least one compressor, such as compressor 52, and at least one turbine, such as a first turbine 54*a* and a second turbine 54*b*, coupled to each other via a shaft 56. As previously noted, the compressor 52 is a mechanical device that raises a pressure of a medium and can be driven by another mechanical device (e.g., a motor or a medium via a turbine). The one or more turbines 54*a*, 54*b* are mechanical devices that are operable to expand a medium and extract work therefrom (also referred to as extracting energy). In the thermodynamic device 50, the at least one turbine 54*a*, 54*b* may drive the compressor 52 via the shaft 56. It should be appreciated that the illustrated thermodynamic device 50 is intended as an example only and that a thermodynamic device having another configuration is also within the scope of the disclosure.

To reduce the likelihood of the occurrence of a compressor surge condition at a cabin air compressing device 30*a*, 30*b*, another conduit 60 may be fluidly connected to the inlet 36 of compressor 32 to supply a flow of a second medium A2 thereto. In such embodiments, the conduit 37, 38 coupled to the inlet 36 may be considered a primary inlet or flow path for supplying the first medium A1*a* or A1*b* to the compressor 36 and the conduit 60 may be considered a secondary inlet or secondary flow path for supplying a second medium A2 to a compressor 36 of at least one, or multiple cabin air compressing devices 30*a*, 30*b*. In the illustrated, non-limiting embodiment of FIG. 1, the conduit 60 includes a plurality of branches fluidly coupled to each of the plurality of cabin air compressing device 30*a*, 30*b*, respectively. For example, a first branch 62 of the conduit 60 is connected at an end thereof to the conduit 37 and a second branch 63 of the conduit 60 is connected at an end thereof to the conduit

38. As shown, the first and second branches 62, 63 may connect to the conduits 37, 38 at a position downstream from the interface joining the first and second conduits 37, 38 and upstream from the inlet 36 of the compressor 32 associated with each respective conduit 37, 38 for example.

Embodiments where one or more branches 62, 63 of the conduit 60 is directly connected to the inlet 36 of a compressor 32 are also within the scope of the disclosure. In embodiments where the conduit 60 or a branch thereof defining the secondary flow path is directly coupled to a compressor 32, the compressor 32 may include a plurality of inlet openings, i.e., a first inlet opening (not shown) for receiving the first medium A1 from the primary conduit 37, 38 and a second inlet opening (not shown) for receiving the second medium A2 from the conduit 60, or a respective branch thereof. Providing a flow to the compressor 32 of each cabin air compressing device 30*a*, 30*b* separately, allows for operation of the compressors 32 at different speeds.

Figure 2:
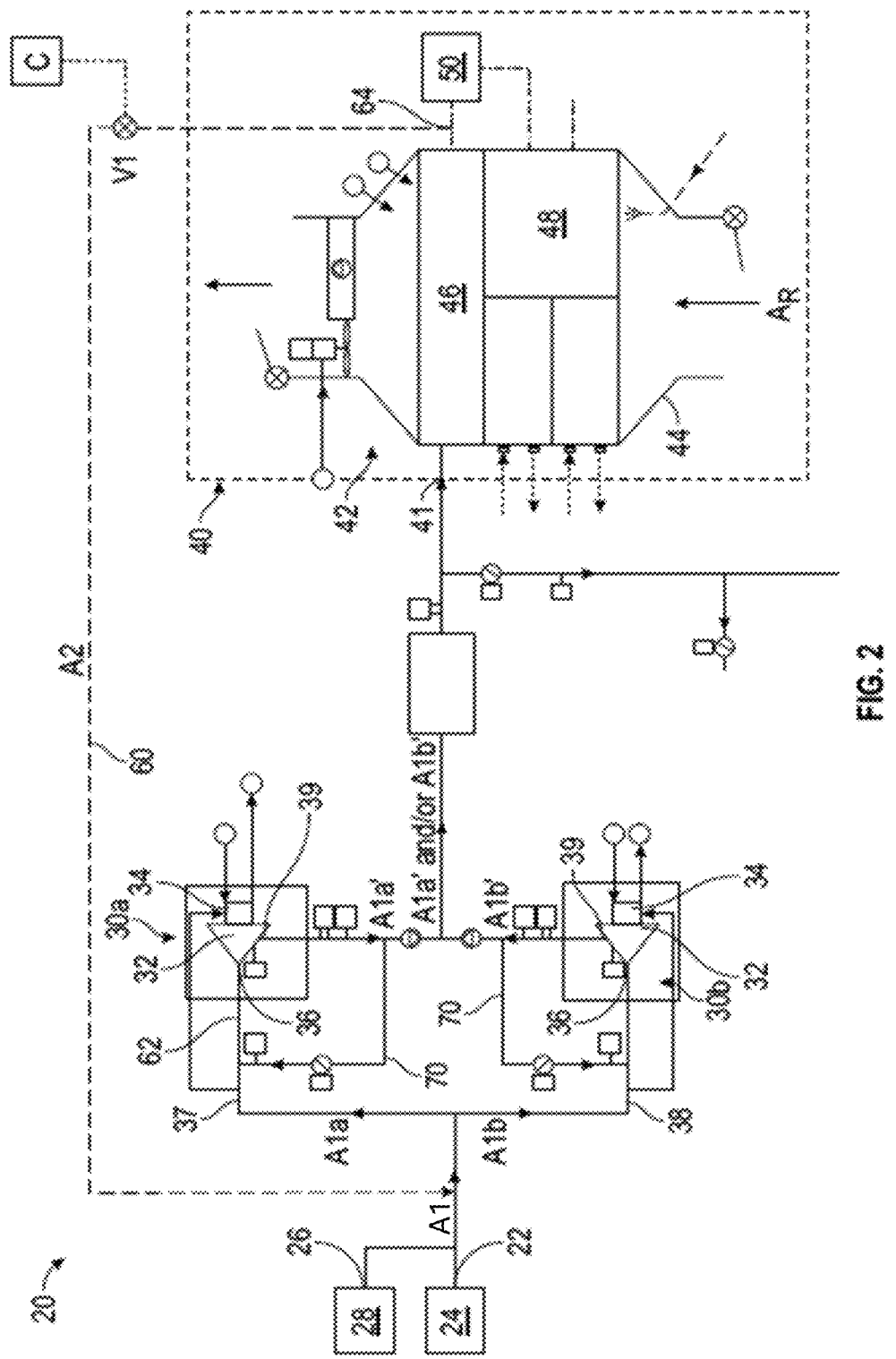
FIG. 2 is a schematic diagram of an environmental control system of a vehicle according to an embodiment.

In other embodiments, as shown in FIG. 2, the conduit 60 may be fluidly coupled to the cabin air compressing devices 30*a*, 30*b* at a location upstream from the interface joining the first and second conduits 37, 38. Such an embodiment may be suitable for use in embodiment where the compressors 32 of the cabin air compressing devices 30*a*, 30*b* are operating at the same speed. However, a valve may be arranged at the interface between the first and second conduits 37, 38 to control the flow provided to each compressor 32.

As shown, the second medium A2 delivered to a compressor 32 of a cabin air compressing device 30*a*, 30*b* via conduit 60 may be the first flow of compressed first medium $A1a'$ and/or the second flow of compressed first medium $A1b'$ provided to the ECS pack 40 via inlet 41. For example, the conduit 60 may be used to divert a portion of the first flow of compressed first medium $A1a'$ and/or the second flow of compressed first medium $A1b'$ provided at an outlet of a heat exchanger of the ram air circuit 42, such as the primary heat exchanger 46 (FIG. 1) or the secondary heat exchanger 48 (FIG. 2) for example. In such embodiments, an upstream end 64 of the conduit 60 may be fluidly coupled to an outlet of the primary heat exchanger 46 or the secondary heat exchanger 48, respectively. Alternatively, the end 64 of the conduit 60 may be fluidly coupled to the ECS pack 40 downstream from a heat exchanger 46, 48, and upstream from another component configured to condition the temperature and/or pressure of the first flow of compressed first medium $A1a'$ and/or a second flow of compressed first medium $A1b'$.

In an embodiment, the pressure of the second medium A2 recirculated to the compressor 32 from the environmental control system 40 is substantially equal to the pressure of the first flow of compressed first medium $A1a'$ and/or the second flow of compressed first medium $A1b'$ output from the compressor 32. However, in other embodiments, the flow of second medium A2 may have been provided to the thermodynamic device 50 prior to being returned to a cabin air compressing device 30*a*, 30*b*. For example, if the first flow of compressed first medium $A1a'$ and/or the second flow of compressed first medium $A1b'$ within the ECS pack 40 is provided to a compressor 52 of the thermodynamic device 50 prior to being recirculated to the compressor 32 of a cabin air compressing device 30*a*, 30*b* as the second medium A2, the pressure of the second medium A2 is greater than that of the first flow of compressed first medium $A1a'$ and/or the second flow of compressed first medium $A1b'$ at the outlet of the compressor 32. Similarly, if the first flow of compressed first medium A1a' and/or the second flow of compressed first medium A1b' within the ECS pack 40 is provided to a turbine of the thermodynamic device 50, such as turbine 54a for example, prior to being recirculated to the compressor 32 of the cabin air compressing device 30a, 30b as the second medium A2, the pressure of the second medium A2 is reduced relative to that of the first flow of compressed first medium A1a' and/or the second flow of compressed first medium A1b' at the outlet of the compressor 32.

In an embodiment, a valve V1 may be operable to control the flow of the second medium A2 recirculated back to the inlet 36 of a compressor 32. The valve V1 may be arranged within the conduit 60 forming the secondary flow path or may be arranged at the interface between a conduit or component within the environmental control system 40 and the conduit 60. In yet another embodiment, the valve V1 may be arranged at the interface of the conduit 37, 38 and the conduit 60 forming the secondary flow path. The valve V1 may be operated or moved between a plurality of positions by a controller C, such as in response to a sensed parameter at the compressor inlet 36 or compressor outlet. For example, the sensed parameter may be the pressure directly upstream from the compressor inlet 36. However, other suitable parameters are also contemplated herein. In other embodiments the valve V1 may be a check valve configured to open in response to a pressure within the conduit 37, 38.

Further, a temperature of the second medium A2 provided to the cabin air compressor via conduit 60 may be controlled by regulating one or more operating conditions of the RAM air circuit 42. For example, the temperature of the medium A3 may be regulated by controlling one or more of the rotational speed of a ram air fan used to move the ram air $A_R$ through the ram air duct 44 and a position of a ram door or scoop providing a flow to the ram air circuit 42. With reference now to FIGS. 3, in other embodiments, an air cycle machine bypass conduit 58 may extend from and fluidly couple an outlet 59 of the compressor 52 and an inlet 57 of the compressor 52. The first flow of further compressed first medium A1a' and/or the second flow of further compressed first medium A1b' output from the compressor 52 of the thermodynamic device 50 and diverted via the air cycle machine bypass conduit 58 is configured to bypass at least one heat exchanger, such as the second heat exchanger for example, located downstream from the compressor outlet 59.

An environmental control system 20 having a system or component operable to divert a flow of medium to a compressor, such as of a cabin air compressing device for example, to reduce or eliminate the likelihood of a compressor surge even has an increased reliability compared to existing systems. Inclusion of a conduit 60 as described herein eliminates the need for a recirculating conduit having a first end directly connected to the outlet of the compressor 32 and a second opposite end directly connected to the inlet of the compressor 32 (see FIG. 1). However, such a recirculating conduit 70 operable to divert a flow output from the compressor 32 directly back to the inlet 36 of the compressor 32 may still be present within the system 20, as shown in FIG. 2.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system for a vehicle comprising:
   a source of a first medium;
   a cabin air compressing device including a first compressor having a compressor inlet and a compressor outlet;
   a conduit fluidly coupling the source of the first medium to the compressor inlet, wherein the first medium provided to the compressor inlet is output at the compressor outlet as a compressed first medium;
   an environmental control system pack located downstream from and fluidly coupled to the compressor outlet, the environmental control system pack including a ram air circuit having at least one ram air heat exchanger and a thermodynamic device including a second compressor and a turbine operably coupled by a shaft; and
   another conduit for providing a second medium to the first compressor, the another conduit fluidly coupling an outlet of the at least one ram air heat exchanger and the compressor inlet;
   wherein a pressure of the second medium is greater than a pressure of the compressed first medium.

2. The environmental control system of claim 1, wherein a pressure of the second medium is equal to a pressure of the compressed first medium.

3. The environmental control system of claim 1, wherein the second medium is the compressed first medium.

4. The environmental control system of claim 1, wherein the at least one ram air heat exchanger further comprises a primary heat exchanger and a secondary heat exchanger, the another conduit being fluidly connected to an outlet of the primary heat exchanger.

5. The environmental control system of claim 1, wherein the at least one ram air heat exchanger further comprises a primary heat exchanger and a secondary heat exchanger, the another conduit being fluidly connected to an outlet of the secondary heat exchanger.

6. The environmental control system of claim 1, wherein the cabin air compressing device further comprises:
   a shaft connected to the first compressor; and
   an electric motor operably connected to the shaft and configured to drive the first compressor.

7. The environmental control system of claim 1, further comprising a valve associated with the another conduit, the valve being operable to control a supply of the second medium provided to the compressor inlet.

8. The environmental control system of claim 7, further comprising a controller operable to move the valve between a plurality of positions to control the supply of the second medium provided to the compressor inlet.

9. The environmental control system of claim 1, wherein the first medium includes ram air.

10. The environmental control system of claim 1, wherein the first medium includes bleed air.

11. The environmental control system of claim 1, wherein the vehicle is an aircraft.

12. A method of operating an environmental control system of a vehicle, the method comprising:

providing a first medium to a compressor inlet of a first compressor of a cabin air compressing device via a conduit;

compressing the first medium at the first compressor to produce a compressed first medium;

providing the compressed first medium to an environmental control system pack including a ram air circuit having a ram air heat exchanger and a thermodynamic device including a second compressor and a turbine operably coupled by a shaft; and directing a flow of a second medium provided at an outlet of the ram air heat exchanger of the environmental control system pack to the compressor inlet, wherein a pressure of the second medium is greater than a pressure of the compressed first medium.

13. The method of claim 12, wherein directing the flow of the second medium to the compressor inlet further comprises operating a valve associated with another conduit, the another conduit fluidly connecting the outlet of the ram air heat exchanger and the compressor inlet.

14. The method of claim 13, further comprising sensing a parameter at the compressor inlet and/or a compressor outlet and operating the valve in response to the parameter.

15. The method of claim 12, wherein the ram air heat exchanger is a primary heat exchanger.

16. The method of claim 12, wherein the ram air heat exchanger is a secondary heat exchanger.

17. The method of claim 12, wherein the second medium is the compressed first medium.

18. The method of claim 12, wherein the vehicle is an aircraft.

* * * * *